United States Patent [19]
Grosseau

[11] 3,848,934
[45] Nov. 19, 1974

[54] HYDRAULIC UNIT FOR A BRAKING MECHANISM PROVIDED WITH AN ANTI-LOCKING SYSTEM

[75] Inventor: Albert Grosseau, Chaville, France

[73] Assignee: Societe Anonyme Automobiles Citroen, Paris, France

[22] Filed: Mar. 7, 1973

[21] Appl. No.: 339,008

[30] Foreign Application Priority Data
Mar. 9, 1972 France................................ 72.8307

[52] U.S. Cl.............. 303/21 F, 188/181 A, 303/68
[51] Int. Cl............................................. B60t 8/06
[58] Field of Search...................... 303/21 F, 61–63, 303/68–69; 188/181

[56] References Cited
UNITED STATES PATENTS

| | | | |
|---|---|---|---|
| 3,550,966 | 12/1970 | Leiber............................. | 303/21 F |
| 3,716,275 | 2/1973 | Skoyles............................ | 303/21 F |
| 3,717,385 | 2/1973 | Michellone et al................ | 303/21 F |
| 3,753,599 | 8/1973 | Michellone et al................ | 303/21 F |

Primary Examiner—Trygve M. Blix
Assistant Examiner—D. C. Butler
Attorney, Agent, or Firm—Marn & Jangarathis

[57] ABSTRACT

There is disclosed an anti-locking braking system for a wheel of a motor vehicle wherein there is provided an exhaust path for the fluid under pressure from a brake cylinder when a device senses the imminent locking of a wheel, such exhaust path includes an accumulator having a volume which increases against a compressional spring force at higher fluid pressure levels. For low pressures a valve, operated by the change in volume of the accumulator, remains open allowing the low pressure fluid to exhaust rapidly via an easy route. If the pressure is high, the valve is closed so that the high pressure fluid is compelled to exhaust via a further accumulator and a flow limiter.

10 Claims, 8 Drawing Figures

HYDRAULIC UNIT FOR A BRAKING MECHANISM PROVIDED WITH AN ANTI-LOCKING SYSTEM

The invention relates to a braking mechanism provided with an anti-locking system for at least one wheel of a vehicle.

Braking systems are known which tend to eliminate the locking of at least one wheel of a vehicle. The latter have drawbacks both in their operation, for example, a permanent consumption of electrical energy by the electromagnetic members and in their construction, in which the arrangement of the various parts is frequently complicated.

The invention proposes to remedy these drawbacks by using means of simple construction still having the advantages of the invention described in French Pat. No. 2.052.196.

The present invention relates to a hydraulic unit for a braking mechanism provided with an anti-locking system for at least one wheel of a vehicle which is intended to ensure the pressure variations of a fluid in the braking members receiving said fluid connected to said wheel both when locking is imminent and when the wheel regains its grip and which is constituted by a source of fluid under pressure controlled by the driver, by said braking members, by a first pipe connected to the source of fluid under pressure, by a second pipe connected to the receiving members and by a third exhaust pipe. Said unit comprises a three-way valve having two stable positions, controlled by a device for detecting the dynamic state of the wheel connected to the three said pipes and able to connect the second pipe selectively to the first pipe and the third pipe, however, on the one hand, a distributor having two positions, which is arranged in the second pipe, closes the latter in its second position as soon as the detection device registers an abnormal state of the wheel, remains in its closing position as long as the value of the pressure of the fluid coming from the said controlled source has not appreciably decreased and opens it thus allowing a substantially free passage of the fluid in its first position, on the other hand, a first conduit provided with a first flow-limiter is branched from said second pipe on either side of said distributor. Moreover, the third pipe comprises a first accumulator as well as a second flow-limiter, whereas a second conduit is branched from said third pipe on either side of the second flow-limiter, which second conduit comprises a valve member constituted by the moving member of a second accumulator permanently connected to the second pipe between the distributor and the receiving members, said moving member being in its position opening said second conduit when the volume of said accumulator is minimal.

In an advantageous embodiment, the moving members of the first and second accumulators and of the distributor are slides mounted to slide in bores.

The controlled valve is also a slide mounted in a bore.

Advantageously, the said bores have parallel axes, thus a single machining direction.

Moreover, the first and second dampers as well as the distributor are housed in a single body, whereas the controlled valve is housed in a second body, the connection of which to the single body ensures the hydraulic connections between the two bodies by means of a joint-support plate.

Advantageously, a first filter is interposed in the first pipe between the source of fluid under pressure and the controlled valve, whereas a second filter is disposed in a branch of the first pipe connected to the distributor.

The two said filters are preferably combined in a single one located at the junction of the first pipe and its branch.

Finally, it will be noted that at least two different covers may be interchangeably attached to the said single body, each of them defining a different abutment for the moving member of the second accumulator and defining different maximum values of the volume of said second accumulator.

The invention will be better understood and secondary features as well as their advantages will be apparent from the description given hereafter as a non-limiting example.

Reference will be made to the accompanying drawings in which:

FIG. 7 is that shown in FIG. 3.

Figure 1:
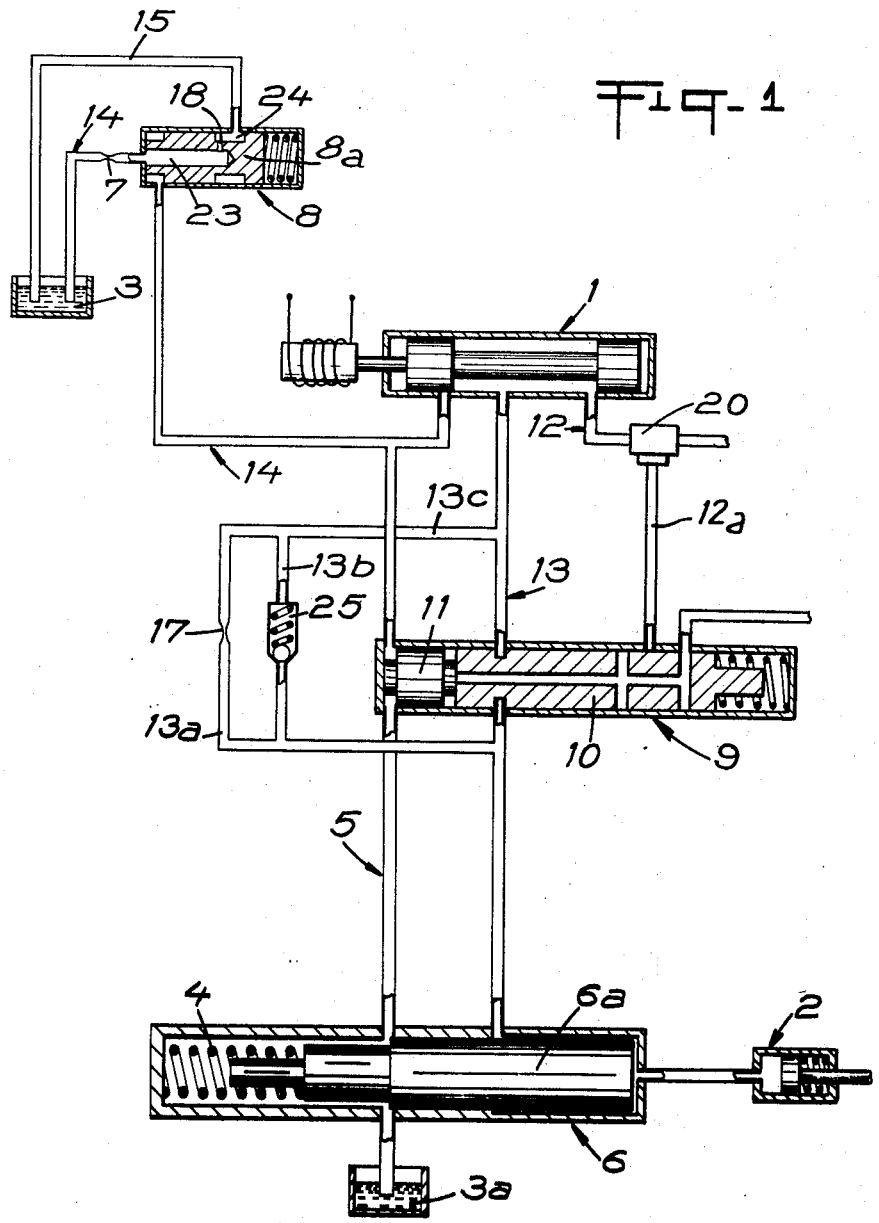
FIG. 1 is a diagram of an embodiment according to the invention.

With reference to FIG. 1, a valve 1 is shown, controlled by a device for detecting an abnormal state of the wheel, which is connected to the source of fluid under pressure by a pipe 12, to fluid pressure actuated brake operators 2 by a pipe 13 and to a fluid reservoir 3 by an exhaust pipe 14. The pipe 13 comprises a distributor 9 in which a slide 10 and an auxiliary piston 11 are slidably mounted, which slide 10 closes and keeps closed the pipe 13 when one of the faces of the piston 11 is subjected to a pressure, either prevailing in a branch 5 of the exhaust pipe 14, or coming from the source of pressure through the intermediary of a branch 12a of the pipe 12. In addition, two conduits 13a and 13b are branched from the pipe 13 on either side of the distributor 9 and also comprise a common part 13c, respectively a flow-limiter 17 and a non-return valve 25 allowing the passage of the fluid from the brake operators 2 to the controlled valve 1. The branch 5 of the pipe 14 extends beyond the distributor 9 to a fluid reservoir 3a advantageously combined with the reservoir 3 and comprises a valve member constituted by the moving member 6a of an accumulator 6 permanently connected to the pipe 13 between the distributor 9 and the brake operators 2. A calibrated spring 4 tends to keep the moving member 6a in its position opening the branch 5 making the volume of the accumulator 6 minimal.

In addition, another accumulator 8 is disposed in the pipe 14 as well as a flow-limiter 7. A conduit 15 is connected in parallel to the pipe 14 upstream of the flow-limiter 7 with respect to the controlled valve 1 by means of an aperture 18 connecting the two chambers 23 and 24 defined by the moving member 8a of said accumulator 8. Thus the conduit 15 ensures a rapid emptying of the accumulator 8. In addition, a filter 20 is located at the junction of the conduits 12 and 12a.

Figure 2:
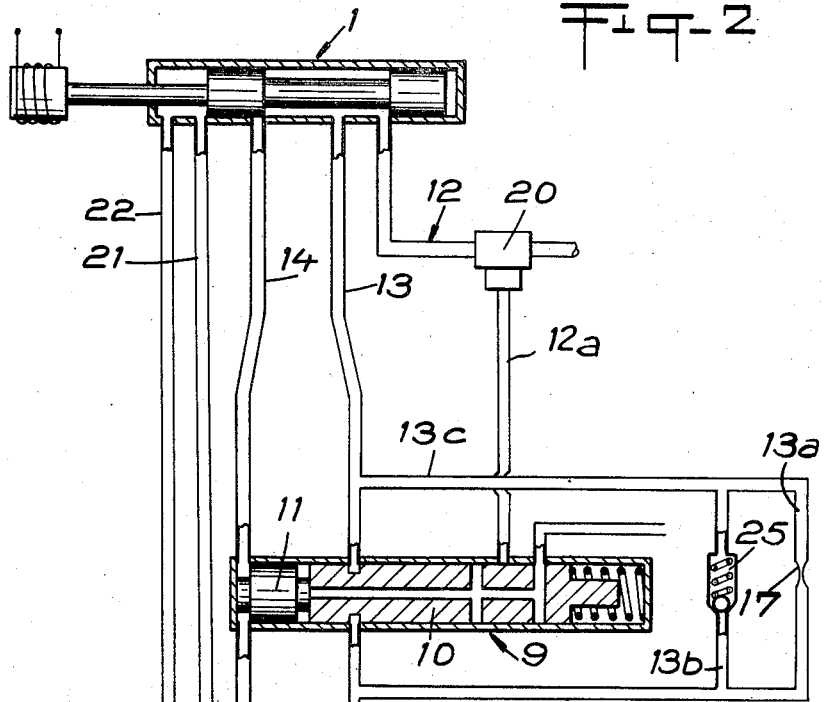
FIG. 2 is a diagram of a variation of this embodiment.
Figure 2:
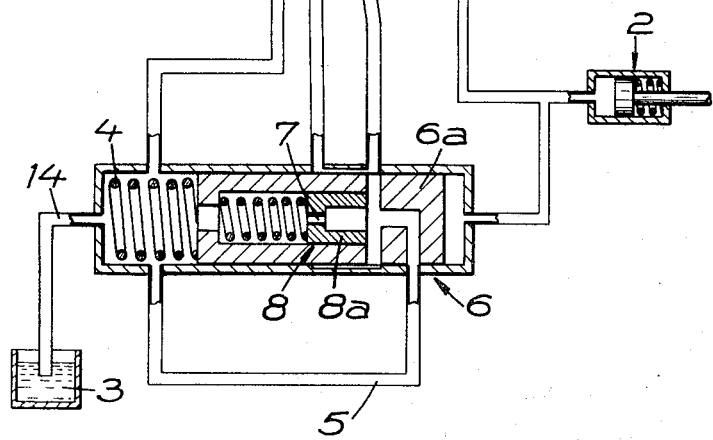

With regard to FIG. 2, certain of the parts appearing in FIG. 1 reappear with the same reference numerals. Nevertheless, it will be noted that the accumulator 8 is housed in the moving member 6a of the accumulator 6, its emptying thus being ensured by the conduits 21 and 22 connected in the position of the controlled valve 1 which establishes the supply of fluid under pressure to the brake operators 2.

In an industrial construction this variation has the advantage of suppressing a bore in a body containing the various afore-described moving members.

In addition, the filling of the damper 8 is favoured at the time of exhausting by the movement of the piston 6a under the action of the spring 4, contrary to that of the piston 8a.

Thus, from these two figures, it will be noted that it is possible to pressurize the brake operators 2 either by way of the pipe 13 when the slide 10 of the distributor 9 is in its open position or by way of the conduit 13a when the slide 10 of the distributor 9 is in its position closing the pipe 13. The passage from the open position to the closed position of the slide 10 of the distributor 9 is effected when the brake operators 2 are exhausted by the controlled valve 1 by the action of the pressure of fluid exhausted on the piston 11. The closing position of this slide 10 is thus maintained throughout the braking operation by the fluid coming from the source of fluid under pressure via the branch 12a and contained between the piston 11 and the slide 10 in the distributor 9.

According to the braking pressure at the time of locking, thus according to the position of the moving member 6a of the accumulator 6, the exhausting of the fluid takes place via the non-return valve 25 and the controlled valve 1 through the conduit 5 for low pressures and through the pipe 14 for high pressures, filling the accumulator 8 and continuing if necessary, through the flow-limiter 7.

FIGS. 3 to 8 illustrate by different sections one embodiment of the various parts shown diagrammatically in FIG. 1. The reference numerals are identical and it will be noted in particular in FIGS. 3 to 5 that the moving members 10, 6a and 8a of the distributor and of the accumulators are cylindrical slides mounted to slide in bores.

Figure 3:
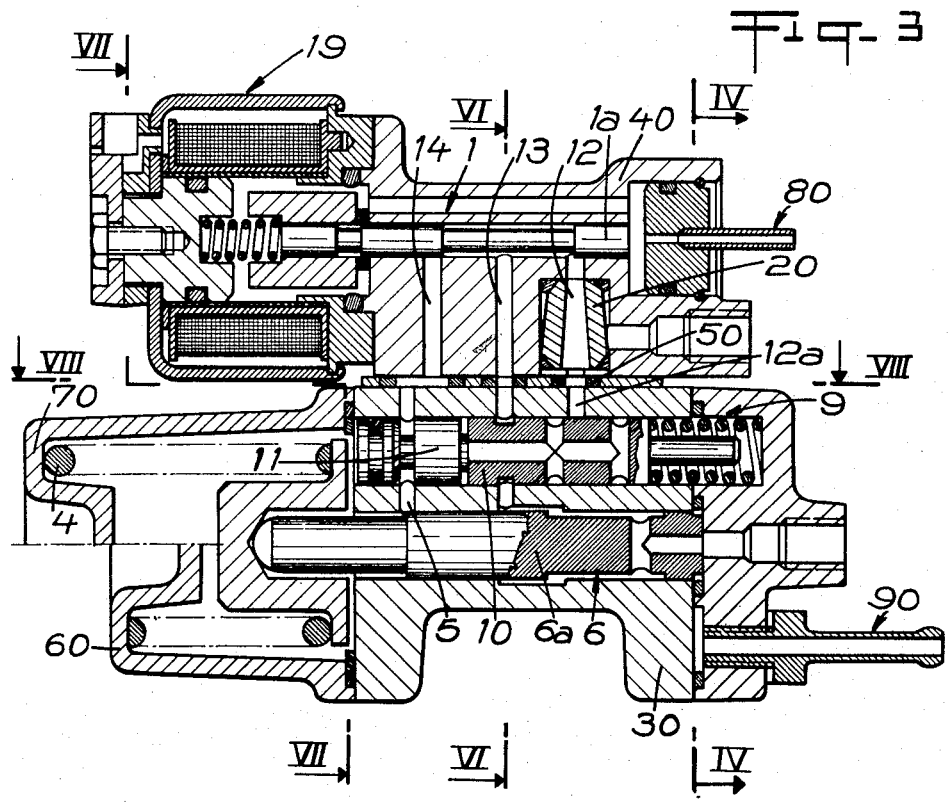
FIG. 3 is a section of an embodiment according to the invention.
Figure 5:
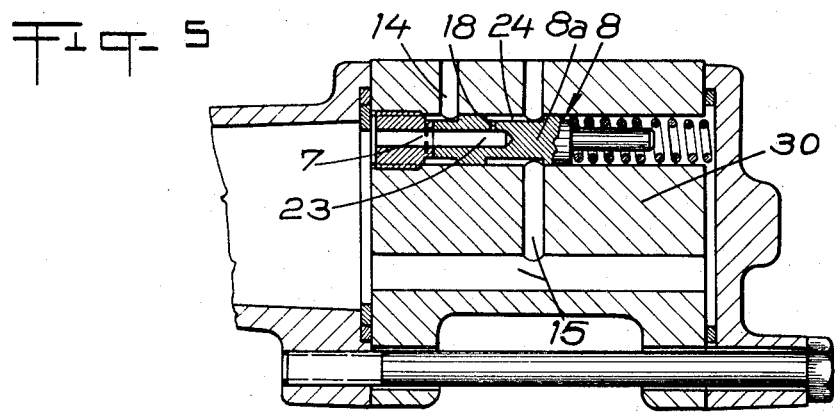
FIG. 5 is a section on line V—V of FIG. 4
Figure 4:
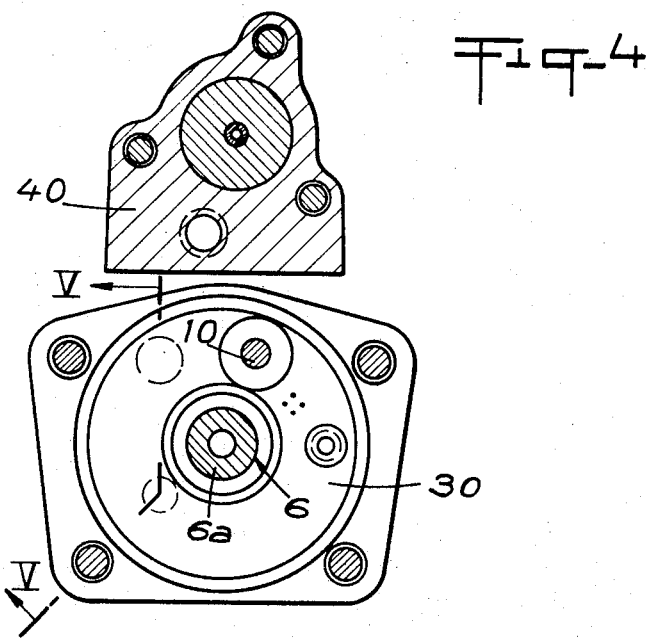
FIG. 4 is a section on line IV—IV of FIG. 3.
Figure 8:
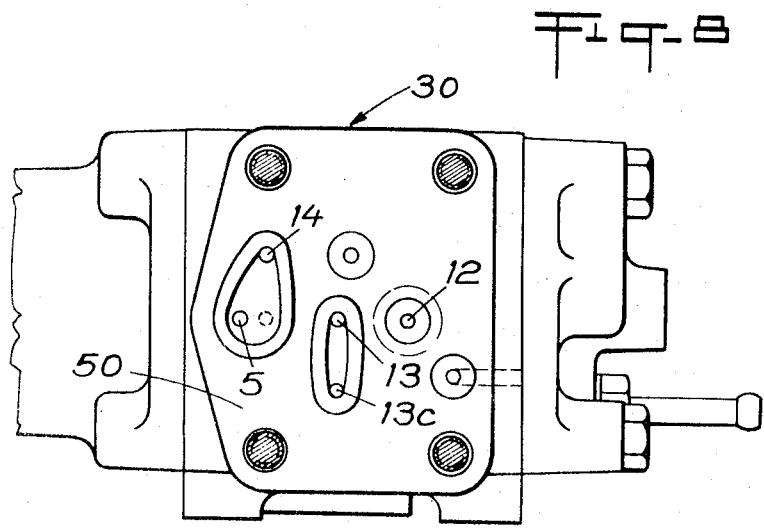
FIG. 8 is a section on line VIII—VIII of FIG. 3.
Figure 6:
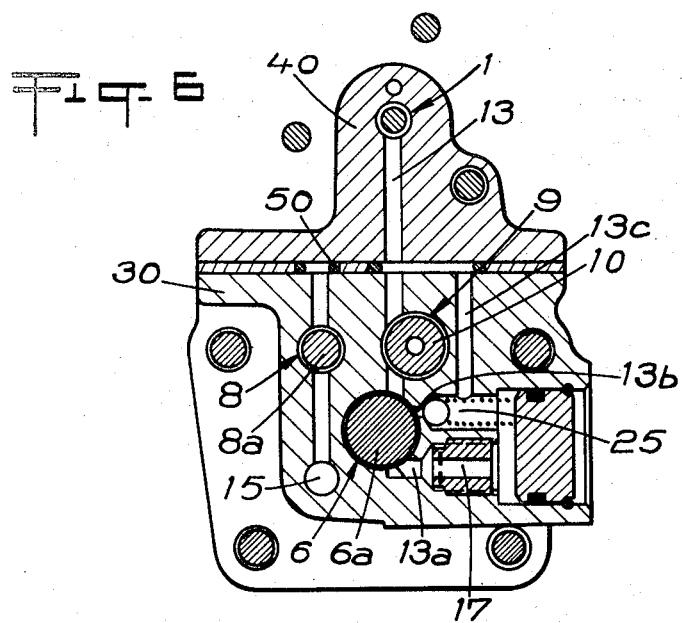
FIG. 6 is a section on line VI—VI of FIG. 3.
Figure 7:
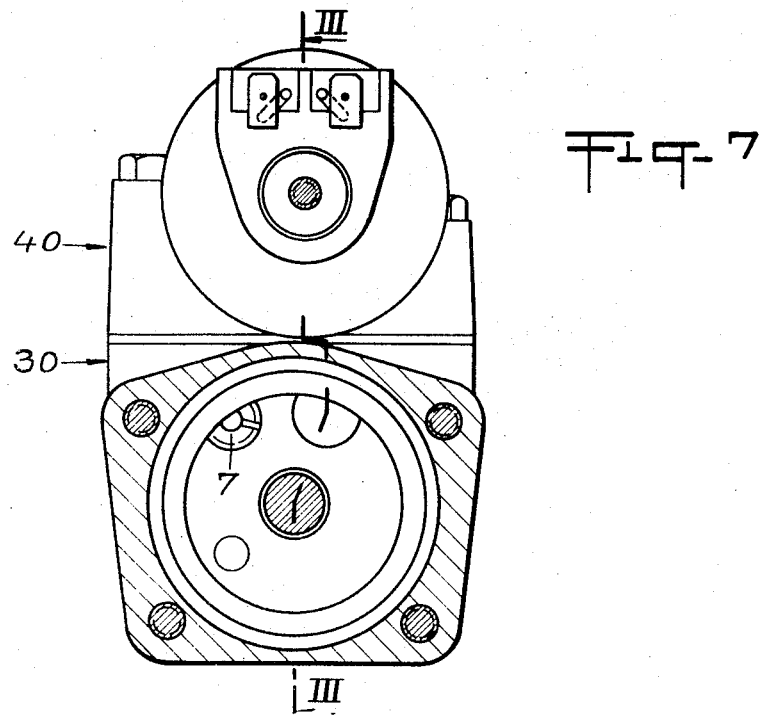
FIG. 7 is a section on line VII—VII of FIG. 3, the section marked III-III on said

FIG. 3 also shows that the controlled valve 1 is constituted by a slide 1a mounted to slide in a bore and integral with the core of an electro-magnet 19 receiving the signals emitted by the device detecting the dynamic state of the wheel.

The said bores have their axes parallel to a common direction which is advantageous as regards their production since they require very accurate machining.

Moreoever, the bores containing the slides 6a, 8a and 10 of the two accumulators and of the distributor are provided in a single body having the reference numeral 30 in FIGS. 3 to 8, whereas the slide 1a of the controlled valve is housed in a second body having the reference numeral 40 in FIGS. 3, 4, 6 and 7. In an advantageous manner, the two bodies 30 and 40 are connected with the interposition of a joint-support plate 50 shown in FIG. 8 which ensures the hydraulic interconnections between said controlled valve and the members contained in the body 30 through the intermediary of internal conduits bore perpendicularly to the said bores.

The filter 20 shown in FIG. 3 is advantageously arranged at the inlet of the hydraulic unit for the fluid coming from the source of pressure and restricts any impurities which are detrimental to the operation of the device, especially if they clog-up the flow limiters 7 and 17.

The connections having the reference numerals 80 and 90 in this same figure are arranged so as to facilitate the connection of conduits for the return of the fluid exhausted or leakages to a reservoir.

FIG. 3 also shows two half-covers 60 and 70 connected to the single body 30. The cover 60 forms an abutment for the slide 6a of the accumulator 6 defining a very small maximum volume of said accumulator but nevertheless allowing the slide 6a a sufficient stroke for closing the conduit 5. The cover 70 provides an abutment for the slide 6a, defining a greater maximum volume of said accumulator. It will be noted that due to the attachment of either the cover 60 or the cover 70 to the body 30, it is possible to adapt the maximum volume of the accumulator 6 mainly depending on the braking circuits in question. In fact, the fluid under pressure admitted into the braking circuits of a vehicle causes an expansion of these circuits which forms an accumulator for said circuits. At the time of exhausting, the contraction of the circuits due to the drop in pressure, forces back the fluid contained in the increase in volume due to said expansion. The fluid forced back is necessary for the correct operation of the device and must have sufficient volume, which is generally the case of the front braking circuit. On the other hand, the rear braking circuit needs the additional fluid stored in the accumulator 6 at the time of pressurizing the brake members and which is forced back at the time of exhausting under the action of the calibrated spring 4.

A hydraulic unit of this type, mounted on a braking circuit with a minimal number of connections is a simple device which tends to suppress the locking of the wheels by ensuring rises and drops in pressure in the braking members under the optimum conditions of safety and comfort.

Its design has the advantage of facilitating industrial production adapted to mass manufacture.

Thus, the present invention has an advantageous application in motor construction.

The invention is not limited to the embodiment which has been described but on the contrary covers all variations which could be applied thereto without diverging from its framework or spirit.

What is claimed is:

1. Hydraulic unit for a braking mechanism having an anti-locking system for at least one wheel of a vehicle which is intended to ensure the pressure variations of a fluid in the brake operators receiving said fluid connected to said wheel both when locking is imminent and when the wheel regains its grip and which is constituted by a source of fluid under pressure controlled by the driver, by said brake operators, by a first pipe connected to the source of fluid under pressure, by a second pipe connected to the brake operators and by a third exhaust pipe, characterized in that a three-way valve having two stable positions controlled by a device detecting the dynamic state of the wheel is connected to the three said pipes and is able to connect the second pipe selectively to the first pipe and the third exhaust pipe, however, on the one hand, a distributor having two positions which is arranged in the second pipe, closes the latter in its second position as soon as the detection device registers an abnormal state of rotation of the wheel and remains in a cloed position as long as the value of the pressure of the fluid from said controlled source has not appreciably decreased and thereby opens the distributor thus allowing a substantially free passage of fluid in said first position and that, on the other hand, a first conduit is provided having a first flow-limiter in parallel flow relationship to said distributor, and in that said third pipe includes a first accumulator and a second flow-limiter, and in that a second conduit is provided in parallel flow relationship to said second flow limiter, said second pipe comprising a valve member constituted by a moving member of a second accumulator permanently connected to said second pipe between said distributor and the brake operators, said moving member being in its position opening said second conduit when the volume of said accumulator is minimal.

2. Hydraulic unit according to claim 1, characterized in that the moving members of the first and second accumulators and of the distributor are slides mounted to slide in bores.

3. Hydraulic unit according to claim 2, characterized in that the controlled valve is a slide mounted to slide in a bore.

4. Hydraulic unit according to claim 3, characterized in that the said bores have parallel axes.

5. Hydraulic unit according to any one of claim 1, characterized in that the first and second accumulators as well as the distributor are housed in a single body.

6. Hydraulic unit according to one of claim 5, characterized in that the controlled valve is housed in a second body, the connection of which to the single body ensures the hydraulic connection between the two bodies by means of a joint-support plate.

7. Hydraulic unit according to any one of claim 1, characterized in that a first filter is interposed in the first pipe between the source of fluid under pressure and the controlled valve.

8. Hydraulic unit according to any one of claim 7, characterized in that a branch of the first pipe is connected to the distributor and in that a second filter is disposed in this branch.

9. Hydraulic unit according to claim 8, characterized in that the two said filters are combined in a single one located at the junction of the first pipe and its branch.

10. Hydraulic unit according to claim 5, characterized in that at least two different covers are able to be interchangeably attached to the said single body, each of them defining a different abutment for the moving member of the second accumulator and defining different maximum values of the volume of said second accumulator.

* * * * *